United States Patent
Witt

[11] Patent Number: 6,141,747
[45] Date of Patent: Oct. 31, 2000

[54] SYSTEM FOR STORE TO LOAD FORWARDING OF INDIVIDUAL BYTES FROM SEPARATE STORE BUFFER ENTRIES TO FORM A SINGLE LOAD WORD

[75] Inventor: David B. Witt, Austin, Tex.

[73] Assignee: Advanced Micro Devices, Inc., Sunnyvale, Calif.

[21] Appl. No.: 09/158,465

[22] Filed: Sep. 22, 1998

[51] Int. Cl.[7] ........................................ G06F 9/38
[52] U.S. Cl. ........................ 712/225; 712/218; 711/138
[58] Field of Search .................... 712/225, 218, 712/23; 711/122, 138, 169, 140

[56] References Cited

U.S. PATENT DOCUMENTS

| | | | |
|---|---|---|---|
| 5,471,598 | 11/1995 | Quattromani et al. ................. | 712/218 |
| 5,606,670 | 2/1997 | Abramson et al. . | |
| 5,802,588 | 9/1998 | Ramagopal et al. .................... | 711/156 |
| 5,832,297 | 11/1998 | Ramagopal et al. . | |
| 5,835,747 | 11/1998 | Trull . | |
| 6,021,485 | 2/2000 | Feiste et al. ............................ | 712/225 |

FOREIGN PATENT DOCUMENTS

| | | |
|---|---|---|
| 0 651 323 | 5/1995 | European Pat. Off. . |
| 0 651 331 | 5/1995 | European Pat. Off. . |
| 0 727 737 | 8/1996 | European Pat. Off. . |
| 97/27538 | 7/1997 | WIPO . |

OTHER PUBLICATIONS

International Search Report for Application No. PCT/US99/07332 mailed Jul. 19, 1999.

*Primary Examiner*—Richard L. Ellis
*Attorney, Agent, or Firm*—Conley, Rose & Tayon, PC; Lawrence J. Merkel

[57] ABSTRACT

A load/store unit searches a store queue included therein for each byte accessed by the load independently from the other bytes, and determines the most recent store (in program order) to update that byte. Accordingly, even if one or more bytes accessed by the load are modified by one store while one or more other bytes accessed by the load are modified by another store, the forwarding mechanism may assemble the bytes accessed by the load. More particularly, load data may be forwarded accurately from an arbitrary number of stores. In other words, forwarding may occur up to N stores (where N is the number of bytes accessed by the load). In one particular embodiment, the load/store unit generates a bit vector from a predetermined set of least significant bits of the addresses of loads and stores. The bit vector includes a bit for each byte in a range defined by the number of least significant bits. The bit indicates whether or not the byte is updated (for store bit vectors) or accessed (for load bit vectors). The load/store unit may then examine the bit vectors (and compare the remaining bits of the store and load addresses, exclusive of the least significant bits used to generate the bit vectors) in order to locate the most recent update of each byte.

26 Claims, 7 Drawing Sheets

SYSTEM FOR STORE TO LOAD FORWARDING OF INDIVIDUAL BYTES FROM SEPARATE STORE BUFFER ENTRIES TO FORM A SINGLE LOAD WORD

BACKGROUND OF THE INVENTION

1. Field of the Invention

This invention is related to the field of processors and, more particularly, to memory dependency checking and forwarding of store data to subsequent loads.

2. Description of the Related Art

Superscalar processors attempt to achieve high performance by issuing and executing multiple instructions per clock cycle and by employing the highest possible clock frequency consistent with the design. Over time, the number of instructions concurrently issuable and/or executable by superscalar processors has been increasing in order to increase the performance of superscalar processors.

Unfortunately, as more instructions are executed concurrently, it becomes more important to rapidly process loads. Loads are accesses to external memory (as opposed to internal registers) in which the data stored at the memory location accessed by the load is transferred into the processor (e.g. into an internal register). By contrast, stores are accesses to external memory in which data produced by the processor is stored into the memory location accessed by the store. While loads and stores are defined to access external memory, one or more caches internal to the processor may be employed to decrease memory latency for accesses which hit in the caches.

Since loads transfer data from memory into the processor, typically so that the data may be operated upon by subsequent instruction operations, it is important to process the loads rapidly in order to provide the data to the subsequent instruction operations. If the data is not provided rapidly, the subsequent instruction operations stall. If other instructions are not available for scheduling for execution, overall instruction throughput may decrease (and may accordingly reduce performance). As superscalar processors attempt to issue/execute larger numbers of instructions concurrently, these effects may increase. Accordingly, the need for rapid load processing may increase as well.

Additionally, the increase in number of instructions concurrently issued/executed in a processor may lead to an increase in the number of stores residing in a store queue, on average. Typically, stores are not committed to memory (cache or external) until after the stores are known to be non-speculative. For example, stores may not be committed until retired. The stores are placed in the store queue, including a store address generated using the address operands of the store and the data to be stored, until the stores can be committed to memory.

While a larger number of stores in the store queue may not present a performance problem alone, the larger number of stores may indirectly present a performance problem for the rapid processing of loads. As the number of stores within the store queue increases, the likelihood that data accessed by a load is in the store queue (as opposed to the cache/external memory) increases. Furthermore, the likelihood that some bytes accessed by the load are modified by one preceding store in the store queue while other bytes accessed by the load are modified by another preceding store in the store queue may increase as well. Even further, the likelihood that store data to be used by the load is not available in the store queue increases. The more frequently these events occur, the larger the barrier to rapid load processing may become.

SUMMARY OF THE INVENTION

The problems outlined above are in large part solved by a load/store unit configured to provide store forwarding to loads. The load/store unit searches a store queue included therein for each byte accessed by the load independently from the other bytes, and determines the most recent store (in program order) to update that byte. Accordingly, even if one or more bytes accessed by the load are modified by one store while one or more other bytes accessed by the load are modified by another store, the forwarding mechanism may assemble the bytes accessed by the load. Advantageously, the load data may be forwarded from the store queue if the load data is stored therein. More particularly, load data may be forwarded accurately from an arbitrary number of stores. For example, forwarding may occur from zero stores (if the store queue is empty or no hits are detected in the store queue for a particular load), one store (if the store is the most recent to update each byte accessed by the load), or up to N stores (where N is the number of bytes accessed by the load). Loads may be processed rapidly, and hence overall performance of a processor including the load/store unit may be increased.

In one particular embodiment, the load/store unit generates a bit vector from a predetermined set of least significant bits of the addresses of loads and stores. The bit vector includes a bit for each byte in a range defined by the number of least significant bits. The bit indicates whether or not the byte is updated (for store bit vectors) or accessed (for load bit vectors). The load/store unit may then examine the bit vectors (and compare the remaining bits of the store and load addresses, exclusive of the least significant bits used to generate the bit vectors) in order to locate the most recent update of each byte. Because the bit vectors identify each accessed/updated byte individually, the processing for locating the most recent update of each byte may be performed independently for each byte (and in parallel). The bytes selected from various store queue entries are then merged together to form the set of bytes accessed by the load.

Broadly speaking, a method for forwarding store data accessed by a load from a store queue is contemplated. A first byte accessed by the load is selected from a first store queue entry within the store queue. A first store corresponding to the first store queue entry is most recent, in program order, to update the first byte. A second byte accessed by the load is selected from a second store queue entry within the store queue, wherein the second store queue entry is different than the first store queue entry. A second store corresponding to the second store queue entry is most recent, in program order, to update the second byte. Selecting the second byte is independent of selecting the first byte.

A load/store unit is contemplated. The load/store unit comprises a store queue configured to store addresses and data corresponding to stores which are not yet retired to a data cache and fowarding logic coupled thereto. The forwarding logic is further coupled to receive a load address, and is configured to determine, independently for each one of a plurality of bytes accessed by a load corresponding to the load address, which one of the stores stored in the store queue is a most recent update of that one of the plurality of bytes. At least one of the plurality of bytes is providable from one store within the store queue and at least another one of the plurality of bytes is providable from another store within the store queue.

Moreover, a processor is contemplated. The processor comprises at least one execution core including one or more address generation units. The address generation units are configured to generate load addresses corresponding to loads and store addresses corresponding to stores. The processor further comprises a load/store unit coupled to the execution core, the load/store unit including a store queue configured to store the store addresses and corresponding store data for stores outstanding within the processor. Additionally, the load/store unit is configured to receive the load addresses and to forward store data corresponding to the loads from the store queue if store data corresponding to the loads is stored therein. The load/store unit is configured to select a particular store within the store queue from which to forward data independently, on a byte by byte basis, for each byte accessed by a particular load.

BRIEF DESCRIPTION OF THE DRAWINGS

Other objects and advantages of the invention will become apparent upon reading the following detailed description and upon reference to the accompanying drawings in which.

Figure 1:
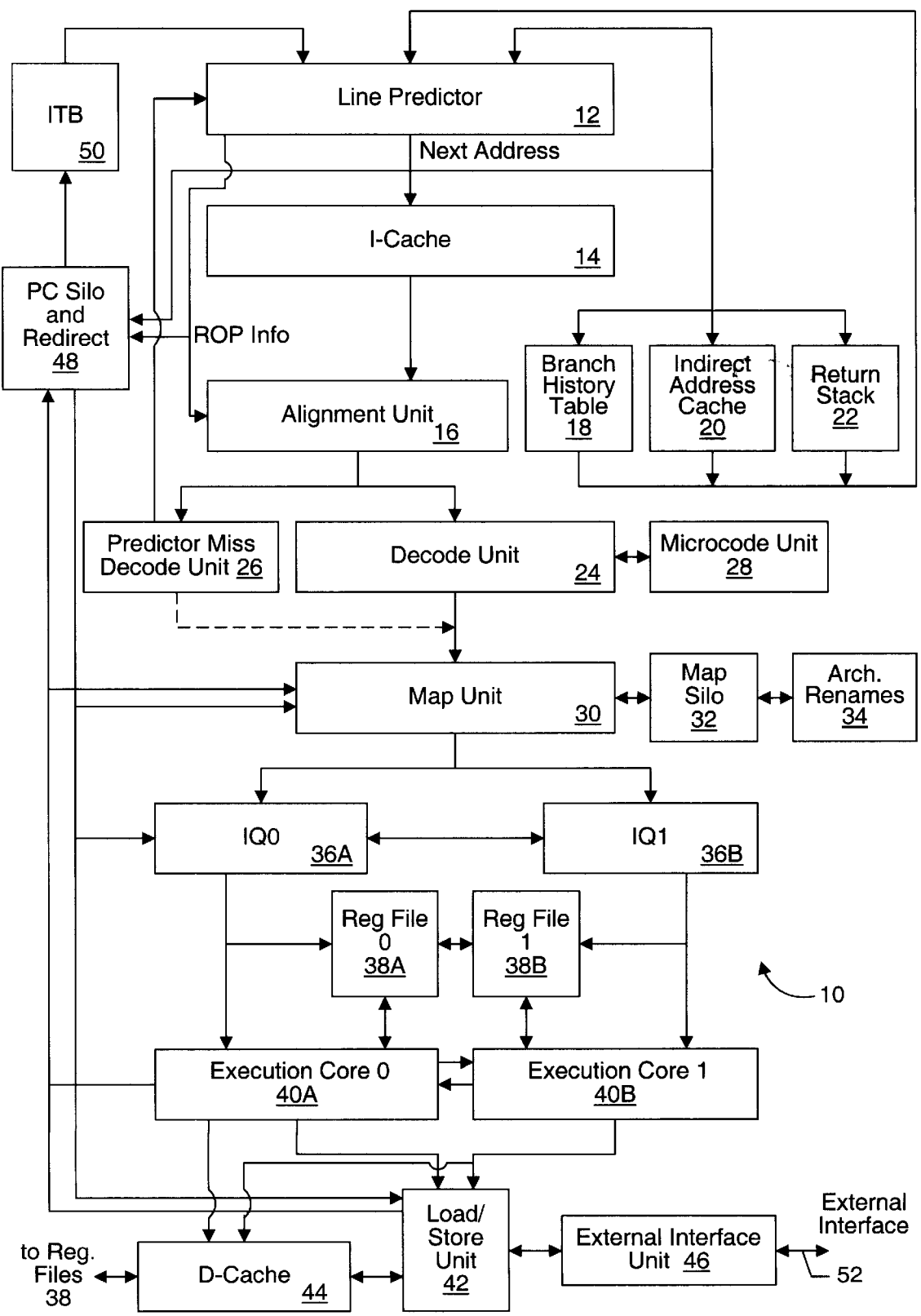
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a processor 10 is shown. Other embodiments are possible and contemplated. In the embodiment of FIG. 1, processor 10 includes a line predictor 12, an instruction cache (I-cache) 14, an alignment unit 16, a branch history table 18, an indirect address cache 20, a return stack 22, a decode unit 24, a predictor miss decode unit 26, a microcode unit 28, a map unit 30, a map silo 32, an architectural renames block 34, a pair of instruction queues 36A–36B, a pair of register files 38A–38B, a pair of execution cores 40A–40B, a load/store unit 42, a data cache (D-cache) 44, an external interface unit 46, a PC silo and redirect unit 48, and an instruction TLB (ITB) 50. Line predictor 12 is connected to ITB 50, predictor miss decode unit 26, branch history table 18, indirect address cache 20, return stack 22, PC silo and redirect block 48, alignment unit 16, and I-cache 14.

I-cache 14 is connected to alignment unit 16. Alignment unit 16 is further connected to predictor miss decode unit 26 and decode unit 24. Decode unit 24 is further connected to microcode unit 28 and map unit 30. Map unit 30 is connected to map silo 32, architectural renames block 34, instruction queues 36A–36B, load/store unit 42, execution cores 40A–40B, and PC silo and redirect block 48. Instruction queues 36A–36B are connected to each other and to respective execution cores 40A–40B and register files 38A–38B. Register files 38A–38B are connected to each other and respective execution cores 40A–40B. Execution cores 40A–40B are further connected to load/store unit 42, data cache 44, and PC silo and redirect unit 48. Load/store unit 42 is connected to PC silo and redirect unit 48, D-cache 44, and external interface unit 46. D-cache 44 is connected to register files 38, and external interface unit 46 is connected to an external interface 52. Elements referred to herein by a reference numeral followed by a letter will be collectively referred to by the reference numeral alone. For example, instruction queues 36A–36B will be collectively referred to as instruction queues 36.

Generally speaking, load/store unit 42 provides for forwarding from a store queue included therein for loads. The forwarding mechanism searches the store queue for each byte of the load independently from the other bytes, and determines the most recent store (in program order) to update the byte. Accordingly, even if one or more bytes accessed by the load are modified by one store while one or more other bytes accessed by the load are modified by another store, the forwarding mechanism may assemble the bytes accessed by the load. Advantageously, the load data may be forwarded from the store queue if the load data is stored therein. Loads may be processed rapidly, and hence overall performance of processor 10 may be increased.

As used herein, the term "program order" refers to the sequence of instructions as specified in a program being executed. A particular store is most recent, in program order, to update a byte if no other stores between (in program order) the particular store and the load for which forwarding is being attempted update the byte.

In one particular embodiment, load/store unit 42 generates a bit vector from a predetermined set of least significant bits of the addresses of loads and stores. The bit vector includes a bit for each byte in a range defined by the number of least significant bits. The bit indicates whether or not the byte is updated (for store bit vectors) or accessed (for load bit vectors). For example, the bit being set may indicate that the byte is updated/accessed and the bit being clear may indicate that the byte is not updated/accessed. Alternatively, the bit being clear may indicate that the byte is updated/accessed and the bit being set may indicate that the byte is not updated/accessed. Load/store unit 42 may generate the store bit vectors as the store addresses are stored into the store queue, and may generate the load bit vectors upon presentation of the corresponding load addresses to data cache 44 and load/store unit 42. Load/store unit 42 may then examine the bit vectors (and compare the remaining bits of the store and load addresses, exclusive of the least significant bits used to generate the bit vectors) in order to locate the most recent update of each byte. Because the bit vectors identify each accessed/updated byte individually, the processing for locating the most recent update of each byte may be performed independently for each byte (and in parallel). The bytes selected from various store queue entries are then merged together to form the set of bytes accessed by the load.

It is noted that loads and stores generally have an address associated therewith which identifies the memory location within memory accessed or updated by the load/store. One or more address operands of the load/store are used by processor 10 to generate the address. Address operands may include register values as well as displacements encoded in the instruction.

In the embodiment of FIG. 1, processor 10 employs a variable byte length, complex instruction set computing (CISC) instruction set architecture. For example, processor 10 may employ the x86 instruction set architecture (also referred to as IA-32). Other embodiments may employ other instruction set architectures including fixed length instruction set architectures and reduced instruction set computing (RISC) instruction set architectures. Certain features shown in FIG. 1 may be omitted in such architectures.

Line predictor 12 is configured to generate fetch addresses for I-cache 14 and is additionally configured to provide information regarding a line of instruction operations to alignment unit 16. Generally, line predictor 12 stores lines of instruction operations previously speculatively fetched by processor 10 and one or more next fetch addresses corresponding to each line to be selected upon fetch of the line. In one embodiment, line predictor 12 is configured to store 1K entries, each defining one line of instruction operations. Line predictor 12 may be banked into, e.g., four banks of 256 entries each to allow concurrent read and update without dual porting, if desired.

Line predictor 12 provides the next fetch address to I-cache 14 to fetch the corresponding instruction bytes. I-cache 14 is a high speed cache memory for storing instruction bytes. According to one embodiment I-cache 14 may comprise, for example, a 256 Kbyte, four way set associative organization employing 64 byte cache lines. However, any I-cache structure may be suitable. Additionally, the next fetch address is provided back to line predictor 12 as an input to fetch information regarding the corresponding line of instruction operations. The next fetch address may be overridden by an address provided by ITB 50 in response to exception conditions reported to PC silo and redirect unit 48.

The next fetch address provided by the line predictor may be the address sequential to the last instruction within the line (if the line terminates in a non-branch instruction). Alternatively, the next fetch address may be a target address of a branch instruction terminating the line. In yet another alternative, the line may be terminated by return instruction, in which case the next fetch address is drawn from return stack 22.

Responsive to a fetch address, line predictor 12 provides information regarding a line of instruction operations beginning at the fetch address to alignment unit 16. Alignment unit 16 receives instruction bytes corresponding to the fetch address from I-cache 14 and selects instruction bytes into a set of issue positions according to the provided instruction operation information. More particularly, line predictor 12 provides a shift amount for each instruction within the line instruction operations, and a mapping of the instructions to the set of instruction operations which comprise the line. An instruction may correspond to multiple instruction operations, and hence the shift amount corresponding to that instruction may be used to select instruction bytes into multiple issue positions. An issue position is provided for each possible instruction operation within the line. In one embodiment, a line of instruction operations may include up to 8 instruction operations corresponding to up to 6 instructions. Generally, as used herein, a line of instruction operations refers to a group of instruction operations concurrently issued to decode unit 24. The line of instruction operations progresses through the pipeline of microprocessor 10 to instruction queues 36 as a unit. Upon being stored in instruction queues 36, the individual instruction operations may be executed in any order.

The issue positions within decode unit 24 (and the subsequent pipeline stages up to instruction queues 36) define the program order of the instruction operations within the line for the hardware within those pipeline stages. An instruction operation aligned to an issue position by alignment unit 16 remains in that issue position until it is stored within an instruction queue 36A–36B. Accordingly, a first issue position may be referred to as being prior to a second issue position if an instruction operation within the first issue position is prior to an instruction operation concurrently within the second issue position in program order. Similarly, a first issue position may be referred to as being subsequent to a second issue position if an instruction operation within the first issue position is subsequent to instruction operation concurrently within the second issue position in program order. Instruction operations within the issue positions may also be referred to as being prior to or subsequent to other instruction operations within the line.

As used herein, an instruction operation (or ROP) is an operation which an execution unit within execution cores 40A–40B is configured to execute as a single entity. Simple instructions may correspond to a single instruction operation, while more complex instructions may correspond to multiple instruction operations. Certain of the more complex instructions may be implemented within microcode unit 28 as microcode routines. Furthermore, embodiments employing non-CISC instruction sets may employ a single instruction operation for each instruction (i.e. instruction and instruction operation may be synonymous in such embodiments). In one particular embodiment, a line may comprise up to eight instruction operations corresponding to up to 6 instructions. Additionally, the particular embodiment may terminate a line at less than 6 instructions and/or 8 instruction operations if a branch instruction is detected. Additional restrictions regarding the instruction operations to the line may be employed as desired.

The next fetch address generated by line predictor 12 is routed to branch history table 18, indirect address cache 20, and return stack 22. Branch history table 18 provides a branch history for a conditional branch instruction which may terminate the line identified by the next fetch address. Line predictor 12 may use the prediction provided by branch history table 18 to determine if a conditional branch instruction terminating the line should be predicted taken or not taken. In one embodiment, line predictor 12 may store a branch prediction to be used to select taken or not taken, and branch history table 18 is used to provide a more accurate prediction which may cancel the line predictor prediction and cause a different next fetch address to be selected. Indirect address cache 20 is used to predict indirect branch target addresses which change frequently. Line predictor 12 may store, as a next fetch address, a previously generated indirect target address. Indirect address cache 20 may override the next fetch address provided by line predictor 12 if the corresponding line is terminated by an indirect branch instruction. Furthermore, the address subsequent to the last instruction within a line of instruction operations may be pushed on the return stack 22 if the line is terminated by a subroutine call instruction. Return stack 22 provides the address stored at its top to line predictor 12 as a potential next fetch address for lines terminated by a return instruction.

In addition to providing next fetch address and instruction operation information to the above mentioned blocks, line predictor 12 is configured to provide next fetch address and instruction operation information to PC silo and redirect unit 48. PC silo and redirect unit 48 stores the fetch address and line information and is responsible for redirecting instruction fetching upon exceptions as well as the orderly retirement of instructions. PC silo and redirect unit 48 may include a circular buffer for storing fetch address and instruction operation information corresponding to multiple lines of instruction operations which may be outstanding within processor 10. Upon retirement of a line of instructions, PC silo and redirect unit 48 may update branch history table 18 and indirect address cache 20 according to the execution of a conditional branch and an indirect branch, respectively. Upon processing an exception, PC silo and redirect unit 48 may purge entries from return stack 22 which are subsequent to the exception-causing instruction. Additionally, PC silo and redirect unit 48 routes an indication of the exception-causing instruction to map unit 30, instruction queues 36, and load/store unit 42 so that these units may cancel instructions which are subsequent to the exception-causing instruction and recover speculative state accordingly.

In one embodiment, PC silo and redirect unit 48 assigns a sequence number (R#) to each instruction operation to identify the order of instruction operations outstanding within processor 10. PC silo and redirect unit 48 may assign R#s to each possible instruction operation with a line. If a line includes fewer than the maximum number of instruction operations, some of the assigned R#s will not be used for that line. However, PC silo and redirect unit 48 may be configured to assign the next set of R#s to the next line of instruction operations, and hence the assigned but not used R#s remain unused until the corresponding line of instruction operations is retired. In this fashion, a portion of the R#s assigned to a given line may be used to identify the line within processor 10. In one embodiment, a maximum of 8 ROPs may be allocated to a line. Accordingly, the first ROP within each line may be assigned an R# which is a multiple of 8. Unused R#s are accordingly automatically skipped.

The preceding discussion has described line predictor 12 predicting next addresses and providing instruction operation information for lines of instruction operations. This operation occurs as long as each fetch address hits in line predictor 12. Upon detecting a miss in line predictor 12, alignment unit 16 routes the corresponding instruction bytes from I-cache 14 to predictor miss decode unit 26. Predictor miss decode unit 26 decodes the instructions beginning at the offset specified by the missing fetch address and generates a line of instruction operation information and a next fetch address. Predictor miss decode unit 26 enforces any limits on a line of instruction operations as processor 10 is designed for (e.g. maximum number of instruction operations, maximum number of instructions, terminate on branch instructions, etc.). Upon completing decode of a line, predictor miss decode unit 26 provides the information to line predictor 12 for storage. It is noted that predictor miss decode unit 26 may be configured to dispatch instructions as they are decoded. In FIG. 1, this option is illustrated with a dotted line. Alternatively, predictor miss decode unit 26 may decode the line of instruction information and provide it to line predictor 12 for storage. Subsequently, the missing fetch address may be reattempted in line predictor 12 and a hit may be detected. Furthermore, a hit in line predictor 12 may be detected and a miss in I-cache 14 may occur. The corresponding instruction bytes may be fetched through external interface unit 46 and stored in I-cache 14.

In one embodiment, line predictor 12 and I-cache 14 employ physical addressing. However, upon detecting an exception, PC silo and redirect unit 48 will be supplied a logical (or virtual) address. Accordingly, the redirect addresses are translated by ITB 50 for presentation to line predictor 12 (and in parallel to I-Cache 14 for reading the corresponding instruction bytes). Additionally, PC silo and redirect unit 48 maintains a virtual lookahead PC value for use in PC relative calculations such as relative branch target addresses. The virtual lookahead PC corresponding to each line is translated by ITB 50 to verify that the corresponding physical address matches the physical fetch address produced by line predictor 12. If a mismatch occurs, line predictor 12 is updated with the correct physical address and the correct instructions are fetched. PC silo and redirect unit 48 further handles exceptions related to fetching beyond protection boundaries, etc. PC silo and redirect unit 48 also maintains a retire PC value indicating the address of the most recently retired instructions. In the present embodiment, PC silo and redirect unit 48 may retire a line of instruction operations concurrently. Accordingly, PC silo and redirect unit 48 may transmit an R# indicative of the line to map unit 30, instruction queues 36A–36B, and load/store unit 42.

Decode unit 24 is configured to receive instruction operations from alignment unit 16 in a plurality of issue positions, as described above. Decode unit 24 decodes the instruction bytes aligned to each issue position in parallel (along with an indication of which instruction operation corresponding to the instruction bytes is to be generated in a particular issue position). Decode unit 24 identifies source and destination operands for each instruction operation and generates the instruction operation encoding used by execution cores 40A–40B. Decode unit 24 is also configured to fetch microcode routines from microcode unit 28 for instructions which are implemented in microcode.

According to one particular embodiment, the following instruction operations are supported by processor 10: integer, floating point add (including multimedia), floating point multiply (including multimedia), branch, load, store address generation, and store data. Each instruction operation may employ up to 2 source register operands and one destination register operand. According to one particular embodiment, a single destination register operand may be assigned to integer ROPs to store both the integer result and a condition code (or flags) update. The corresponding logical registers will both receive the corresponding PR# upon retirement of the integer operation. Certain instructions may generate two instruction operations of the same type to update two destination registers (e.g. POP, which updates the ESP and the specified destination register).

The decoded instruction operations and source and destination register numbers are provided to map unit 30. Map unit 30 is configured to perform register renaming by assigning physical register numbers (PR#s) to each destination register operand and source register operand of each instruction operation. The physical register numbers identify registers within register files 38A–38B. Additionally, map unit 30 assigns a queue number (IQ#) to each instruction operation, identifying the location within instruction queues 36A–36B assigned to store the instruction operation. Map unit 30 additionally provides an indication of the dependencies for each instruction operation by providing queue numbers of the instructions which update each physical register number assigned to a source operand of the instruction operation. Map unit 30 updates map silo 32 with the physical register numbers and instruction to numbers assigned to each instruction operation (as well as the corresponding logical register numbers). Furthermore, map silo 32 may be configured to store a lookahead state corresponding to the logical registers prior to the line of instructions and an R# identifying the line of instructions with respect to the PC silo. Similar to the PC silo described above, map silo 32 may comprise a circular buffer of entries. Each entry may be configured to store the information corresponding one line of instruction operations.

Map unit 30 and map silo 32 are further configured to receive a retire indication from PC silo 48. Upon retiring a line of instruction operations, map silo 32 conveys the destination physical register numbers assigned to the line and corresponding logical register numbers to architectural renames block 34 for storage. Architectural renames block 34 stores a physical register number corresponding to each logical register, representing the committed register state for each logical register. The physical register numbers displaced from architectural renames block 34 upon update of the corresponding logical register with a new physical register number are returned to the free list of physical register numbers for allocation to subsequent instructions. In one embodiment, prior to returning a physical register number to the free list, the physical register numbers are compared to the remaining physical register numbers within architectural renames block 34. If a physical register number is still represented within architectural renames block 34 after being displaced, the physical register number is not added to the free list. Such an embodiment may be employed in cases in which the same physical register number is used to store more than one result of an instruction. For example, an embodiment employing the x86 instruction set architecture may provide physical registers large enough to store floating point operands. In this manner, any physical register may be used to store any type of operand. However, integer operands and condition code operands do not fully utilize the space within a given physical register. In such an embodiment, processor 10 may assign a single physical register to store both integer result and a condition code result of an instruction. A subsequent retirement of an instruction which overwrites the condition code result corresponding to the physical register may not update the same integer register, and hence the physical register may not be free upon committing a new condition code result. Similarly, a subsequent retirement of an instruction which updates the integer register corresponding to the physical register may not update the condition code register, and hence the physical register may not be free upon committing the new integer result.

Still further, map unit 30 and map silo 32 are configured to receive exception indications from PC silo 48. Lines of instruction operations subsequent to the line including the exception-causing instruction operation are marked invalid within map silo 32. The physical register numbers corresponding to the subsequent lines of instruction operations are freed upon selection of the corresponding lines for retirement (and architectural renames block 34 is not updated with the invalidated destination registers). Additionally, the lookahead register state maintained by map unit 30 is restored to the lookahead register state corresponding to the exception-causing instruction.

The line of instruction operations, source physical register numbers, source queue numbers, and destination physical register numbers are stored into instruction queues 36A–36B according to the queue numbers assigned by map unit 30. According to one embodiment, instruction queues 36A–36B are symmetrical and can store any instructions. Furthermore, dependencies for a particular instruction operation may occur with respect to other instruction operations which are stored in either instruction queue. Map unit 30 may, for example, store a line of instruction operations into one of instruction queues 36A–36B and store a following line of instruction operations into the other one of instruction queues 36A–36B. An instruction operation remains in instruction queue 36A–36B at least until the instruction operation is scheduled for execution. In one embodiment, instruction operations remain in instruction queues 36A–36B until retired.

Instruction queues 36A–36B, upon scheduling a particular instruction operation for execution, determine at which clock cycle that particular instruction operation will update register files 38A–38B. Different execution units within execution cores 40A–40B may employ different numbers of pipeline stages (and hence different latencies). Furthermore, certain instructions may experience more latency within a pipeline than others. Accordingly, a countdown is generated which measures the latency for the particular instruction operation (in numbers of clock cycles). Instruction queues 36A–36B await the specified number of clock cycles (until the update will occur prior to or coincident with the dependent instruction operations reading the register file), and then indicate that instruction operations dependent upon that particular instruction operation may be scheduled. For example, in one particular embodiment dependent instruction operations may be scheduled two clock cycles prior to the instruction operation upon which they depend updating register files 38A–38B. Other embodiments may schedule dependent instruction operations at different numbers of clock cycles prior to or subsequent to the instruction operation upon which they depend completing and updating register files 38A–38B. Each instruction queue 36A–36B maintains the countdowns for instruction operations within that instruction queue, and internally allow dependent instruction operations to be scheduled upon expiration of the countdown. Additionally, the instruction queue provides indications to the other instruction queue upon expiration of the countdown. Subsequently, the other instruction queue may schedule dependent instruction operations. This delayed transmission of instruction operation completions to the other instruction queue allows register files 38A–38B to propagate results provided by one of execution cores 40A–40B to the other register file. Each of register files 38A–38B implements the set of physical registers employed by processor 10, and is updated by one of execution cores 40A–40B. The updates are then propagated to the other register file. It is noted that instruction queues 36A–36B may schedule an instruction once its dependencies have been satisfied (i.e. out of order with respect to its order within the queue).

Instruction operations scheduled from instruction queue 36A read source operands according to the source physical register numbers from register file 38A and are conveyed to execution core 40A for execution. Execution core 40A executes the instruction operation and updates the physical register assigned to the destination within register file 38A. Some instruction operations do not have destination registers, and execution core 40A does not update a destination physical register in this case. Additionally, execution core 40A reports the R# of the instruction operation and exception information regarding the instruction operation (if any) to PC silo and redirect unit 48. Instruction queue 36B, register file 38B, and execution core 40B may operate in a similar fashion.

In one embodiment, execution core 40A and execution core 40B are symmetrical. Each execution core 40 may include, for example, a floating point add unit, a floating point multiply unit, two integer units, a branch unit, a load address generation unit, a store address generation unit, and a store data unit. Other configurations of execution units are possible.

Among the instruction operations which do not have destination registers are store address generations, store data operations, and branch operations. The store address/store data operations provide results to load/store unit 42. Load/store unit 42 provides an interface to D-cache 44 for performing memory data operations. Execution cores 40A–40B execute load ROPs and store address ROPs to generate load and store addresses, respectively, based upon the address operands of the instructions More particularly, load addresses and store addresses may be presented to D-cache 44 upon generation thereof by execution cores 40A–40B (directly via connections between execution cores 40A–40B and D-Cache 44). Load addresses which hit D-cache 44 result in data being routed from D-cache 44 to register files 38. On the other hand, store addresses which hit are allocated a store queue entry. Subsequently, the store data is provided by a store data instruction operation (which is used to route the store data from register files 38A–38B to load/store unit 42). Accordingly, a store may comprise a store address instruction operation and a store data instruction operation in this embodiment. In other words, the store address instruction operation and corresponding store data instruction operation are derived from the same instruction. The store may be an instruction, or may be an implicit portion of another instruction having a memory destination operand. Upon retirement of the store instruction, the data is stored into D-cache 44. Additionally, load/store unit 42 may include a load/store buffer for storing load/store addresses which miss D-cache 44 for subsequent cache fills (via external interface 46) and re-attempting the missing load/store operations. Load/store unit 42 is further configured to handle load/store memory dependencies.

Figure 2:
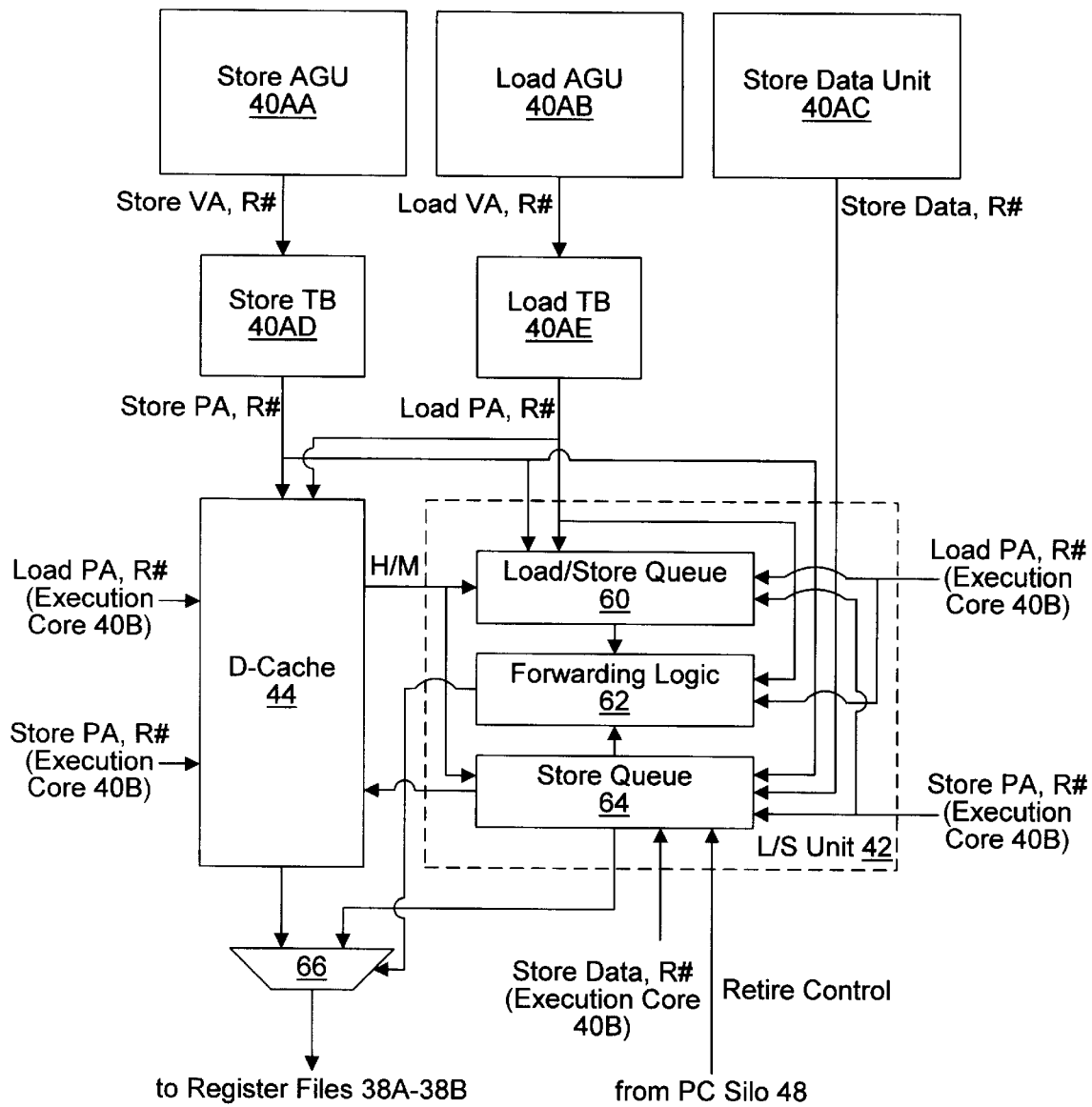
FIG. 2 is a block diagram of portions of one embodiment of the processor shown in FIG. 1, including a data cache, a load/store unit, and functional units.

Turning now to FIG. 2, a block diagram of one embodiment of portions of processor 10 is shown. Other embodiments are possible and contemplated. In the embodiment of FIG. 2, a store address generation unit (AGU) 40AA, a load AGU 40AB, and a store data unit 40AC are shown. Store AGU 40AA, load AGU 40AB, and store data unit 40AC are included within execution core 40A (shown in FIG. 1). Execution core 40B may be configured similarly in one embodiment. Alternatively, execution core 40B may omit one or more of the execution units illustrated in FIG. 2. Additionally illustrated in FIG. 2 is a store translation buffer (TB) 40AD and a load TB 40AE which may be included in execution core 40A. D-cache 44 and load/store unit 42 are illustrated, with load/store unit 42 including a load/store queue 60, a forwarding logic 62, and a store queue 64. Finally, a rotate/mux circuit 66 is shown. Store AGU 40AA is connected to store TB 40AD, which is further connected to D-cache 44, load/store queue 60, and store queue 64. Load AGU 40AB is connected to load TB 40AE, which is further connected to data cache 44, load/store queue 60, and forwarding logic 62. Store data unit 40AC is connected to store queue 64. PC silo 48 is connected to store queue 64 as well. Store queue 64, forwarding logic 62, and data cache 44 are connected to rotate/mux circuit 66, which is further connected to register files 38A–38B. Data cache 44 is connected to load/store queue 60 and store queue 64. Execution core 40B is connected to data cache 44, load/store queue 60, forwarding logic 62, and store queue 64 in the present embodiment as well.

Store AGU 40AA executes store address ROPs and generates a store address corresponding to the store from which the store address ROP was derived. The address generated is a virtual address (VA) which is conveyed to store TB 40AD for translation into a physical address (PA). Any suitable translation mechanism may be employed, and the translation mechanism is generally defined according to the instruction set architecture employed by processor 10. For example, one embodiment of processor 10 employs the x86 instruction set architecture. In such an embodiment, the virtual address is a logical address which is first translated through a segmentation mechanism to a linear address. A flat addressing mode may be employed in which the logical and linear addresses are equal. The linear address is translated through a paging mechanism to a physical address. Store TB 40AD stores recently used translations for rapidly performing the translation. If a translation for a given address is not found in store TB 40AD, then a translation buffer reload sequence is performed to search translation information stored in external memory for the corresponding translation.

Store queue 64 stores addresses and data corresponding to stores outstanding within processor 10 (i.e. issued and not yet retired). More particularly in the current embodiment, store queue 64 holds stores which have been executed but not yet retired. Accordingly, store queue 64 is configured to receive a physical store address and corresponding R# from store TB 40AD. Upon receiving an address, store queue 64 allocates a store queue entry for the store and places the store address therein. Store queue 64 may similarly receive physical store addresses from a store AGU/store TB structure within execution core 40B as well.

Subsequently, the store data ROP corresponding to the store is executed by store data unit 40AC. Store data unit 40AC transmits the store data along with the R# assigned to the store data ROP to store queue 64. Store queue 64 stores the store data into the store queue entry assigned to the corresponding store. Store queue 64 may similarly receive store data from a store data unit within execution unit 40B as well.

Similar to the operation of store AGU 40AA and store TB 40AD, load AGU 40AB and load TB 40AE generate a load physical address corresponding to a load ROP and transmit the load physical address to forwarding logic 62. Forwarding logic 62 determines whether or not bytes accessed by the load are stored in store queue 64. Treating each accessed byte independently, forwarding logic 62 searches store queue 64 for a most recent store to that byte. If an update is located, the byte is selected from store queue 64 and provided to rotate/mux circuit 66. In this fashion, each accessed byte is provided from the most recent update of the byte within store queue 64 (if an update is located for that byte). Each byte may be provided from a separate store, or two or more bytes may be provided from the same store while other bytes are provided from different stores, or the same store may provide all accessed bytes, as the case may be. Accordingly, the accessed bytes selected from store queue 64 are effectively merged to provide the load data at rotate/mux circuit 66.

Forwarding logic 62 also provides selection and rotation controls to rotate/mux circuit 66. If forwarding logic 62 detects that a load ROP receives forwarded data from a store in store queue 64, then forwarding logic 62 signals rotate/mux circuit 66 to select the data provided from store queue 64. Additionally, the data provided from store queue 64 is in memory order (i.e. the bytes are stored in store queue 64 in byte locations aligned according to the address of the corresponding stores). The data may be rotated to be aligned properly for storage in register files 38A–38B. Forwarding logic 62 provides this signalling as well. Finally, if forwarding logic 62 detects that a load ROP does not receive forwarded data from store queue 64, then forwarding logic 62 signals rotate/mux circuit 66 to select the output of data cache 44.

It is noted that a load ROP may be executed prior to the store data ROP which provides store data accessed by the load ROP. In such a case, store queue 64 may provide the R# of the store data ROP instead of the accessed bytes. The load ROP may be rescheduled for execution subsequent to the scheduling of the store data ROP. Load/store unit 42 may signal instruction queues 36A–36B when store data is not yet available for forwarding to the load to permit rescheduling of the load (as well as any subsequently scheduled ROPs). Additionally, map unit 30 may be configured to predict load hit store cases in which the store data was not available. The R# of the store data ROP may be provided to PC silo 48, which may provide information regarding the store instruction to map unit 30 for use in predicting subsequent load hit store (with the store data not available) scenarios.

In addition to providing load and store addresses to store queue 64 in accordance with the above, load and store addresses are presented to data cache 44 to determine if a hit in data cache 44 is detected. For load ROPs, if a hit in data cache 44 is detected, data is forwarded from data cache 44 to register files 38A–38B. If a load ROP misses data cache 44, then the load ROP is stored into load/store queue 60 for subsequent reattempting (and ultimately for transmission to external interface unit 46 to fetch the missing cache line from memory, if the load ROP reaches the head of load/store queue 60 and is no longer speculative w/o becoming a hit in d-cache 44 via a cache fill from an earlier memory operation). Upon being reattempted to data cache 44, the load ROP is also conveyed to forwarding logic 62 to determine if store data in store queue 64 is to be forwarded for the load ROP. Hit/miss indications for each load ROP attempted to data cache 44 (from either execution core 40A or 40B) are conveyed to load/store queue 60 to determine if the load ROP is to be stored therein. For store address ROPs, the hit/miss indication determines whether or not the store is allocated an entry in load/store queue 60 (similar to load ROPs). However, store address ROPs are allocated into store queue 64 regardless of their hit/miss status. It is noted that, while any number of entries may be employed, load/store queue 60 may comprise 128 entries and store queue 64 may comprise 64 entries in one exemplary embodiment.

PC silo 48 provides retirement control signals to store queue 64. As mentioned above, in the present embodiment PC silo 48 retires a line of ROPs concurrently. PC silo 48 may provide the R# of the ROPs being retired to store queue 64 for store queue 64 to select store data to commit to data cache 44. If a particular store cannot be immediately committed (e.g. if the store is a miss in data cache 44 or more than one store is retired concurrently), store queue 64 may record the retirement of the particular store and commit the store data subsequently.

It is noted that, while the embodiment shown in FIG. 2 (and other figures below) employs physical addresses for performing store to load forwarding, other embodiments are contemplated in which virtual addresses, logical addresses, or linear addresses are used. It is further noted that, although in the above embodiment execution core 40B is described as having the same load/store execution resources as execution core 40A (i.e. that execution core 40A and 40B are symmetrical with respect to execution resources). However, other embodiments may employ asymmetrical execution resources, as desired.

Figure 3:
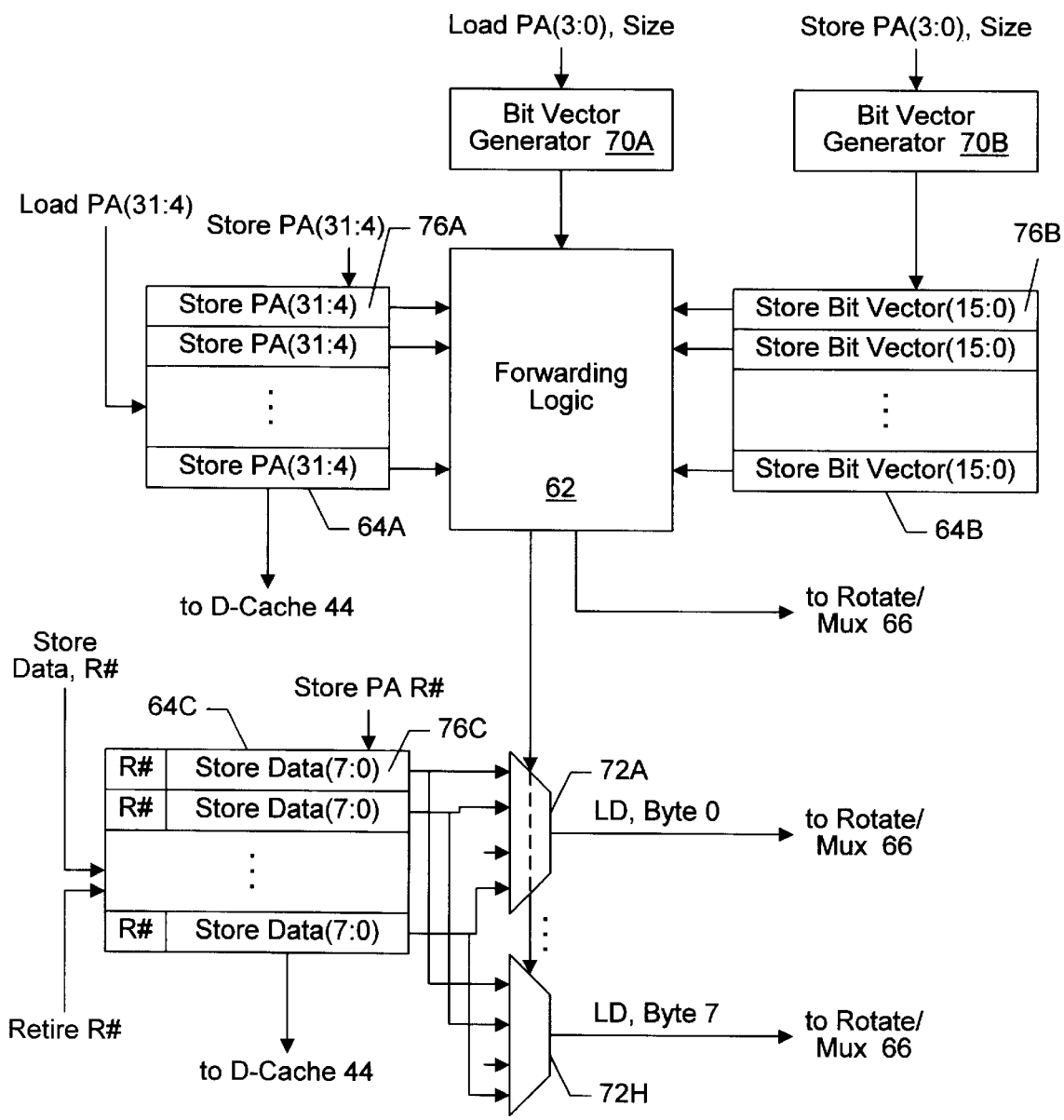
FIG. 3 is a block diagram illustrating a store queue and forwarding logic according to one embodiment of the load/store unit shown in FIG. 2.

Turning next to FIG. 3, a block diagram illustrating one embodiment of store queue 64 and forwarding logic 62 is shown. Other embodiments are possible and contemplated. As illustrated in FIG. 3, store queue 64 includes a store address queue 64A, a store bit vector queue 64B, and a store data queue 64C. Additionally, a pair of bit vector generators 70A and 70B are shown in FIG. 3. FIG. 3 illustrates the forwarding of data for one load address, for simplicity in the drawing. As shown in FIG. 2, store queue 64 may be configured to supply load data for up to three load ROPs (one each from execution core 40A and 40B and one for loads being reattempted from load/store queue 60). Similar hardware may be employed for the other load ROPs. For the present discussion, load information will be described as being received from load TB 40AE and store address information from store TB 40AD. Store data information will be described as being received from store data unit 40AC. However, other sources for each information are contemplated, including those shown in FIG. 2. Furthermore, the addresses may be received directly from AGUs in embodiments in which virtual addresses are used for forwarding purposes.

Bit vector generator 70A is connected to receive a predetermined number of least significant bits of the load address and an indication of the size of the load (i.e. the number of bytes accessed beginning at the load address) from load TB 40AE, and is further connected to forwarding logic 62. Similarly, bit vector generator 70B is connected to receive the predetermined number of least significant bits of the store address and the size of the store from store TB 40AD, and is connected to store bit vector queue 64B. It is noted that, in embodiments in which loads are only one size, the size information may be omitted. Store bit vector queue 64B and store address queue 64A are connected to forwarding logic 62, which is further connected to a set of multiplexors (muxes) 72A–72H and to rotate/mux circuit 66. Muxes 72A–72H are connected to rotate/mux circuit 66 and to store data queue 64C. Store data queue 64C is connected to receive store data and a corresponding R# from store data unit 70AC, as well as to PC silo 48 to receive a retiring R#. Furthermore, store data queue 64C is connected to receive an R# corresponding to a store address ROP from store TB 40AD. Store address queue 64A is connected to receive a store address from store TB 40AD and a load address from load TB 40AE. More particularly, store address queue 64A is coupled to receive the addresses exclusive of the least significant bits received by bit vector generators 70A.

The predetermined number of least significant bits received by bit vector generators 70A and 70B define a range of bytes within which the bytes being accessed or updated may reside. In other words, the address exclusive of the least significant bits is the same for a set of bytes within the range of bytes. Bit vector generators 70A–70B generate bit vectors having a bit for each byte within that range. The bit is set if the byte is accessed/updated in response to the corresponding load or store, and clear if the byte is not accessed/updated in response to the corresponding load or store. Store bit vectors generated by bit vector generator 70B are stored in store bit vector queue 64B. Accordingly, store bit vectors are generated for each store address presented to store queue 64. Load bit vectors generated by bit vector generator 70A are provided to forwarding logic 62.

The remaining bits of the load address (exclusive of the bits used to form the load bit vector) are provided to store address queue 64A. The load address is compared to the store addresses stored in store address queue 64A. Store address queue 64A may, for example, be a content addressable memory (CAM) for load addresses against the store addresses stored therein. Alternative configurations are possible as well. Each entry within store address queue 64A containing a store address which matches the provided load address asserts a "hit" signal to forwarding logic 62.

In addition to the load bit vector and the hit signals from store address queue 64A, forwarding logic 62 receives the store bit vectors corresponding to the stores within store queue 64. Forwarding logic 62 treats each byte independently, examining the corresponding bit in the load bit vector to determine if the byte is accessed and examining the corresponding bit in each store bit vector to determine if the byte is updated by the corresponding store. Each store queue entry which indicates that a byte is updated (via the corresponding bit in the store bit vector and a corresponding asserted hit signal from store address queue 64A) participates in a pick one circuit within forwarding logic 62, which picks the most recent update to the byte according to the program order of the stores in the store queue. The selected byte is retrieved from store data queue 64C via select signals asserted by forwarding logic 62 to muxes 72. Each mux 72A–72H corresponds to a different byte within store queue 64. For example, mux 72A selects byte 0 of the load data from the byte 0 positions of each entry within store queue 64 under control of forwarding logic 62. Similarly, mux 72H selects byte 7 of the load data from the byte 7 positions of each entry within store queue 64 under control of forwarding logic 62. Other byte positions are selected by other muxes (not shown for simplicity in FIG. 3). Additionally, forwarding logic 62 determines if load data bytes are provided from store queue 64, and provides select controls to rotate/mux circuit 66 to select the data bytes provided from muxes 72 as inputs to rotate/mux circuit 66.

Rotation controls are also provided by forwarding logic 62. Data bytes are stored in store queue 64C in memory order (i.e. in byte locations within the queue entry which correspond to memory locations within a memory block aligned to a boundary which is the size of the queue entry, such as an eight byte boundary for the eight byte data queue entries of the present exemplary embodiment). While loads and stores to memory may have any alignment with respect to the memory locations, the byte locations within the register are fixed. Accordingly, rotation of the data bytes provided by muxes 72 may be performed to align the bytes to the register file.

Generally, an entry in store queue 64 is allocated upon execution of a store address ROP corresponding to a store. The entry comprises an entry in store address queue 64A, an entry in store bit vector queue 64B, and an entry in store data queue 64C. For example, entries 76A, 76B, and 76C illustrated in FIG. 3 may comprise a store queue entry in store queue 64. The store address (exclusive of the least significant bits used to generate the bit vector) is stored into store address queue 64A and the corresponding store bit vector into store bit vector queue 64B upon receipt of the store address from store TB 40AD. Additionally, the R# corresponding to the corresponding store data ROP is stored into store data queue 64C upon receipt of the store address from store TB 40AD. In the present embodiment, the store data ROP succeeds the store address ROP within the same line of ROPs. Accordingly, the corresponding R# is the R# of the store address ROP incremented by one.

Subsequently, the corresponding store data ROP is executed by store data unit 40AC, and the R# and store data are provided to store data queue 64C. The R# provided by store data unit 40AC is compared to the R#s stored in store data queue 64C to determine the entry into which the store data should be stored. Store data queue 64C may be implemented, for example, as a CAM for the R# of the store data operation, in one embodiment. Alternative configurations are possible as well. The entry which for which a match on the R# is detected records the data. Store data queue 64C may additionally include a valid bit indicating that the data is valid. A CAM match may be used to set the valid bit. If the data is not valid, store data queue 64C may provide the R# of the store data operation as an input to muxes 72A–72H instead of the data. Alternatively, the R# may be stored in each byte location within store data queue 64C to automatically provide the R# if the data is not yet valid.

In the present exemplary embodiment, bit vectors include 16 bits while the store data queue stores up to eight bytes of store data per entry. The present exemplary embodiment thus supports up to eight bytes of store data per store. However, 16 bits of bit vector are supported to allow for the unambiguous support of unaligned 8 byte values. In other words, with a bit vector having 16 bits, any unaligned eight byte quantity is representable as a mask of zeros and ones. If the bit vector were, for example, 8 bits, then the entire bit vector would be ones for an eight byte store regardless of the alignment of the store (and hence regardless of whether or not the bytes accessed by the load are updated by the store). In general, it may be desirable to employ bit vectors of 2N bits where N is the largest number of bytes updateable by a single store.

It is noted that, since bit vectors having 16 bits are implemented in the present exemplary embodiment and 8 byte loads and stores are the largest loads and stores supported in the present exemplary embodiment, certain bits within the bit vector are mutually exclusive. For example, the bit corresponding to byte 0 within the range indicated by the bit vector and the bit corresponding to byte 8 within the range are mutually exclusive. If byte 0 is indicated as accessed/updated, then byte 8 cannot be indicated as accessed/updated. Similarly, byte 1 and byte 9 are mutually exclusive, etc. Additionally, a byte which corresponds to either byte 0 or byte 8 within the bit vector is stored in the byte 0 position within store data queue 64C. Accordingly, pick logic may logically OR the results of examining bit vector positions 0 and 8 to generate selection controls for byte 0 of store data queue 64C. However, prior to ORing the results, the bits are independently examined to determine if the corresponding byte is both accessed by the load and updated by the corresponding store.

PC silo 48 provides a retire R# indicative of a line of ROPs being retired. Store data queue 64C compares the retire R# to the R#s stored in store data queue 64C. Store data queue 64C may operate as a CAM with respect to the retire R#, according to one exemplary embodiment. Alternative configurations are possible and contemplated. The CAM on the retire R# may compare only the portion of the R# which identifies the line with the R# provided by PC silo 48. Any detected matches indicate that the store in that queue entry is retired and may be committed to d-cache 44. Store queue 64 may include a bit in each entry, for example, indicating whether or not the store may be committed to d-cache 44. The bit may be set according to the comparison of the retire R#. Once a store has been indicated as retired, the store may be selected from store queue 64 for transmission to d-cache 44. Upon updating d-cache 44, the store may be deleted from store queue 64.

It is noted that, although certain bit ranges and sizes of other features are set forth in this description and in FIG. 3, these ranges and sizes are merely exemplary and may be varied as a matter of design choice. It is further noted that, as an alternative to employing bit vector generators 70A–70B, the address generation units may be configured to generate the corresponding bit vectors. It is further noted that one alternative to the CAM structures mentioned above may be to implement the queue entries in registers with separate comparator circuits connected thereto for performing the comparison. Other alternatives are possible as well.

Figure 4:
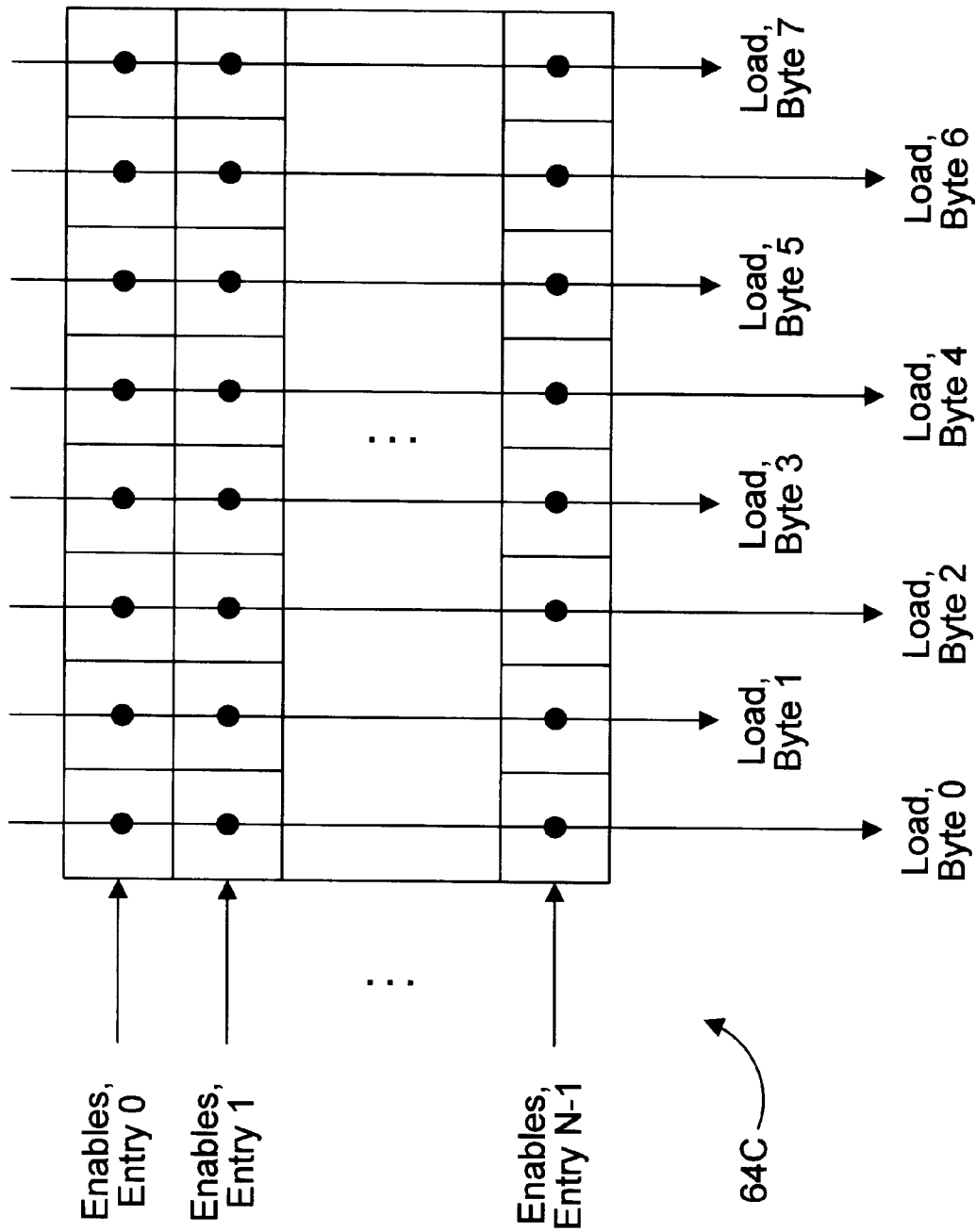
FIG. 4 is a diagram illustrating an exemplary implementation of a store data portion of the store queue shown in FIG. 3.

Turning now to FIG. 4, an exemplary embodiment of store data queue 64C which may eliminate the separate mux circuits 72A–72H shown in FIG. 3 is shown. Other alternative configurations, including the one shown in FIG. 3, are contemplated. As shown in FIG. 4, store data queue 64C is connected to a set of load byte buses which were illustrated in FIG. 3 as outputs of each of muxes 72A–72H. Byte 0 of each store queue entry is connected to the Load, byte 0 bus. Similarly, byte 1 of each store queue entry is connected to the Load, byte 1 bus, etc. The select signals formerly provided to muxes 72A–72H instead are provided as enable signals to each of the queue entries. One enable signal is provided for each byte within the queue entry. If the enable signal for that byte is asserted, the queue entry drives that byte on the bus connected thereto. If the enable signal is deasserted, the queue entry does not drive the byte on the bus connected thereto. This configuration is typically referred to as a "wired OR" configuration.

Figure 5:
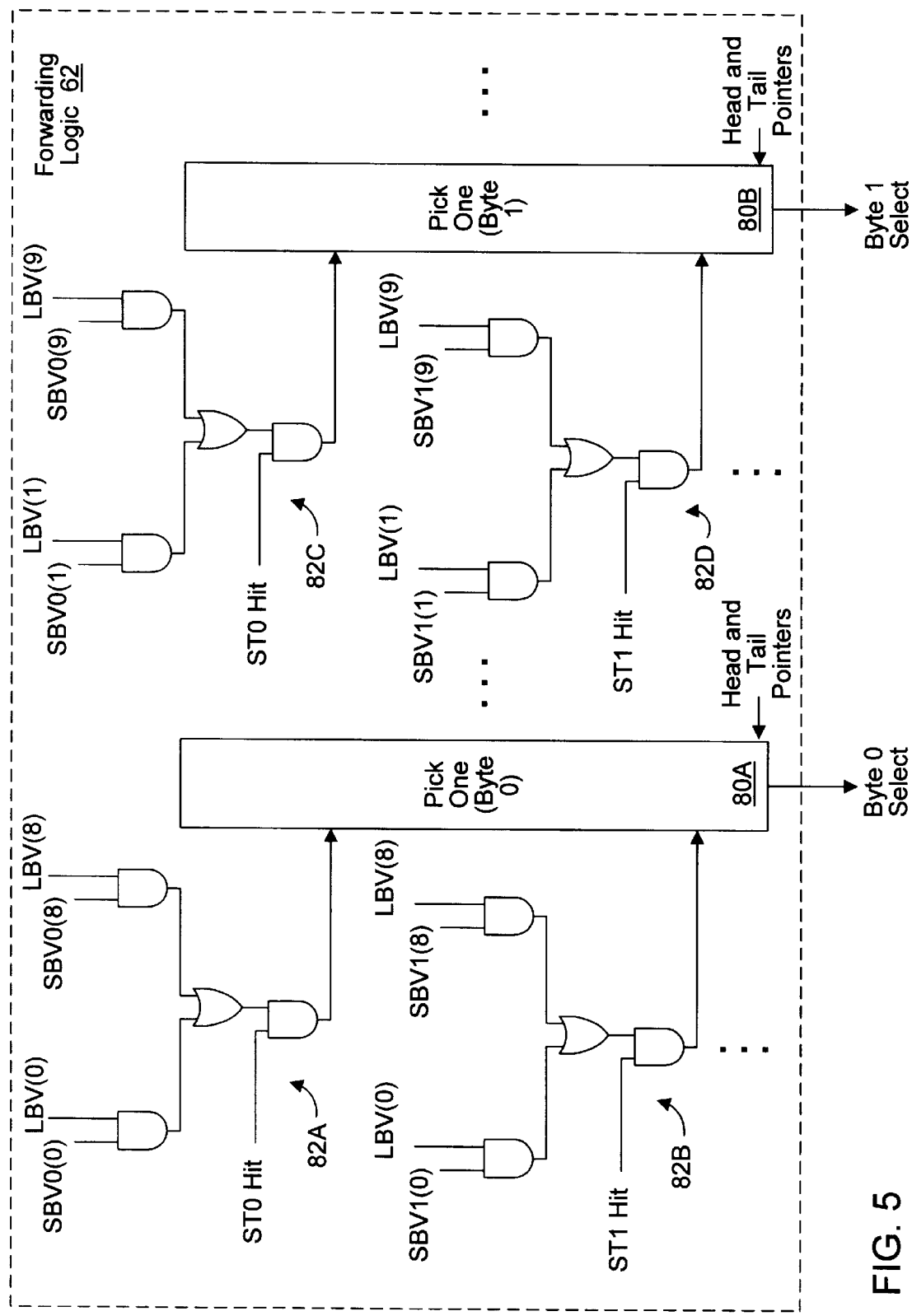
FIG. 5 is a diagram illustrating one embodiment of the forwarding logic shown in FIG. 3.

Turning next to FIG. 5, a block diagram of a portion of one embodiment of forwarding logic 62 is shown. Other embodiments are possible and contemplated. In the embodiment of FIG. 5, forwarding logic 62 includes a plurality of pick one circuits (one for each byte which may be forwarded to a load, e.g. 8 pick one circuits in one particular embodiment). For example, pick one circuits 80A and 80B are shown in FIG. 5. Additionally, combinatorial logic is provided in forwarding logic 62 to process the bit vectors from bit vector generator 70A and store bit vector queue 64B as well as hit signals for store address queue 64A. For example, combinatorial logic 82A is provided to process bytes zero and eight for store queue entry zero. Similarly, combinatorial logic 82B processes bytes zero and eight for store queue entry one, while combinatorial logic 82C and 82D process bytes one and nine for store queue entries zero and one, respectively. Other combinatorial logic (not shown) processes other bytes and/or other store queue entries.

Pick one circuit 80A selects byte zero from store data queue 64C. Pick one circuit 80B selects byte one from store data queue 64C. Other pick one circuits (not shown in FIG. 5) are employed to select bytes two through seven. Pick one circuits 80A and 80B are each connected to receive input signals from combinatorial logic which determines, for each store queue entry, whether or not the entry is storing a store which updates a particular byte which is accessed by the load. For example, combinatorial logic 82A determines if the store in store queue entry zero is updating byte zero or byte eight (SBV0(0) and SBV0(8), respectively) within the range of bytes defined by the bit vector and the corresponding byte zero or byte eight is accessed by the load (LBV(0) and LBV(8), respectively). The resulting determinations are logically ORed together (since access byte 0 and byte 8 is mutually exclusive in the exemplary embodiment) and combined with the hit signal for store address queue 64A for entry zero (ST0 Hit). If the byte is accessed by the load and updated by the store (as indicated by the corresponding bit vectors) and the load and store addresses (exclusive of the bits used to generate the bit vectors) match, the combinatorial logic asserts a signal to the pick one circuits and the store queue entry participates in the pick one. Otherwise, the signal is deasserted to the pick one logic circuit and the store queue entry does not participate in the pick one.

Similarly, combinatorial logic 82B analyzes the store queue bit vector from store queue entry one (SBV1 in FIG. 5), the load bit vector, and the store address queue hit signal for store queue entry one (ST1 Hit in FIG. 5) to assert/deassert a signal. Combinatorial logic 82C and 82D examine the bits from the store and load bit vectors for bytes one and nine (store queue entry zero for combinatorial logic 82C and store queue entry one for combinatorial logic 82D).

The pick one circuits, independent from each other, select the most recent update of the byte to which that pick one circuit is assigned. For example, pick one circuit 80A selects byte zero from store data queue 64C responsive to the bit vector indications for bytes zero and eight and the store address queue hit signals. Independently, pick one circuit 80B selects byte one from store data queue 64C. Accordingly, pick one circuit 80A provides select signals to mux 72A (FIG. 3) or the enable signals for byte zero of each queue entry (FIG. 4). Similarly, pick one circuit 80B may provide select signals to a mux connected to provide byte one of the load data (FIG. 3) or the enable signals for byte one of each queue entry (FIG. 4). In one embodiment, store queue 64 is implemented as a circular first-in, first-out (FIFO) buffer having a head pointer indicating the oldest entry in the queue and a tail pointer indicating the most recent entry. Instead of shifting entries as entries are deleted, the head and tail pointers are incremented and decremented to add and delete stores to the queue. Pick one circuits 80A–80B receive the head and tail pointers for such an embodiment, and scan from the input signals from combinatorial logic such as combinatorial logic 82A–82D from the signal corresponding to the entry indicated by the tail pointer to the signal corresponding to the entry indicated by the head pointer. For such an embodiment, stores may be allocated into store queue 64 in program order. As an alternative, R#s may be used to determine order of the stores in the store queue, if desired.

It is noted that, although combinatorial logic 82A–82D is shown in FIG. 5 to illustrate the logical determination of store queue entries to participate in the selection of bytes from the store queue, any suitable logic may be used. The senses of the input signals (asserted/deasserted) may be altered to provide alternative combinatorial logic, and logically equivalent sets of logic gates may be employed as well, as desired. It is further noted that an additional logic block (not shown in FIG. 5) may be employed to generate the selection and rotation controls for rotate/mux circuit 66. The selection controls may be based upon the selection of bytes from store queue 64 for forwarding, and the rotation controls may be based upon the least significant load address bits (which define the alignment of bytes within memory and hence within store data queue 64C) and the size of the load (which defines how many bytes are transferred into the destination register).

Figure 6:
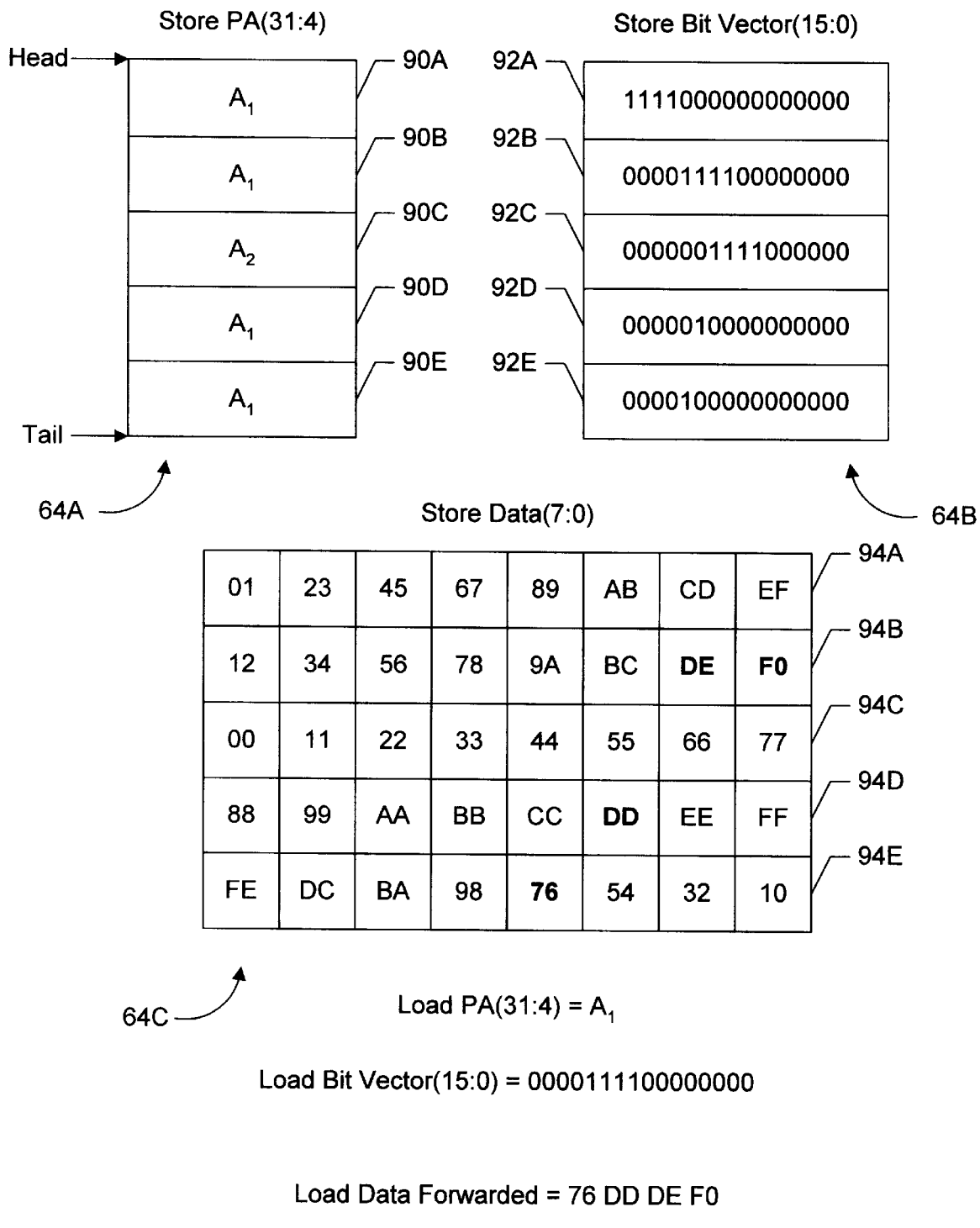
FIG. 6 is an example of forwarding data from the store queue shown in FIG. 2.

Turning next to FIG. 6, an example of forwarding from an exemplary set of store queue entries are shown. Store address queue 64A, store bit vector queue 64B, and store data queue 64C are shown in FIG. 6. For simplicity in the example, five entries are shown. However, the store queue may include any suitable number of entries. For example, store queue 64 may include 64 entries in one exemplary embodiment. Store address queue 64A includes entries 90A–90E. Store bit vector queue 64B includes corresponding entries 92A–92E and store data queue 64C includes corresponding entries 94A–94E. In other words, entries 90A, 92A, and 94A comprise a first entry in store queue 64. Similarly, entries 90B, 92B, and 94B comprise a second entry in store queue 64, etc. In the example, the store queue head pointer indicates that the entry comprising entries 90A, 92A, and 94A is the oldest entry in the queue and the store queue tail pointer indicates that the entry comprising entries 90E, 92E and 94E is the most recent entry. The remaining entries lie between the oldest and most recent entries.

Store address queue entries 90A, 90B, 90D, and 90E each store a particular address $A_1$. Store address queue entry 90C stores a different address $A_2$. The bit vectors corresponding to each store are illustrated in store bit vector queue entries 92A–92E and the store data is illustrated in store data queue entries 94A–94E.

In the example, a load is performed having address $A_1$ and a load bit vector as illustrated in FIG. 6. According to the load bit vector, four bytes are being accessed (bytes 11, 10, 9, and 8). Examining the bit vectors in store bit vector queue 64B, the following updates to accessed bytes are noted: bit vectors in entries 92B and 92E indicate updates of byte 11; bit vectors in entries 92B and 92D indicate updates to byte 10; and bit vectors in entries 92B and 92C indicate updates to bytes 9 and 8. However, the address in store address queue entry 90C (which corresponds to bit vector queue entry 92C) stores the address $A_2$. Since the load accesses address $A_1$, the store in entries 90C, 92C and 94C is eliminated from forwarding consideration. Accordingly, the pick one circuits scan for the most recent update to: byte 11 from entries corresponding to 92B and 92E; byte 10 from entries 92B and 92D; and bytes 9 and 8 from entry 92B.

As noted above, the tail pointer indicates the most recent entry is the entry corresponding to 90E while the head pointer indicates the oldest entry is the entry corresponding to 90A. Accordingly, byte 11 is selected from entry 94E; byte 10 is selected from entry 94D, and bytes 9 and 8 are selected from entry 94B. Byte 11 is byte position three within the store data queue, and similarly byte 10 is byte position two, byte 9 is byte position one, and byte 8 is byte position 0. Therefore, the forwarded data for the load is 76 DD DE F0 (in hexadecimal). The value 76 is drawn from byte position three of entry 94E. The value DD is drawn from byte position two of entry 94D. The values DE and F0 are drawn from byte positions one and zero (respectively) of entry 94B. These values are illustrated in bold within store data queue 64C in the example.

As the example illustrates, the bytes accessed by the load may be assembled even if the bytes are drawn from two or more different stores. Advantageously, load data may be forwarded accurately from an arbitrary number of stores. For example, forwarding may occur from zero stores (if store queue 64 is empty or no hits are detected in store queue 64 for a particular load), one store (if the store is the most recent to update each byte accessed by the load), or up to N stores (where N is the number of bytes accessed by the load).

Figure 7:
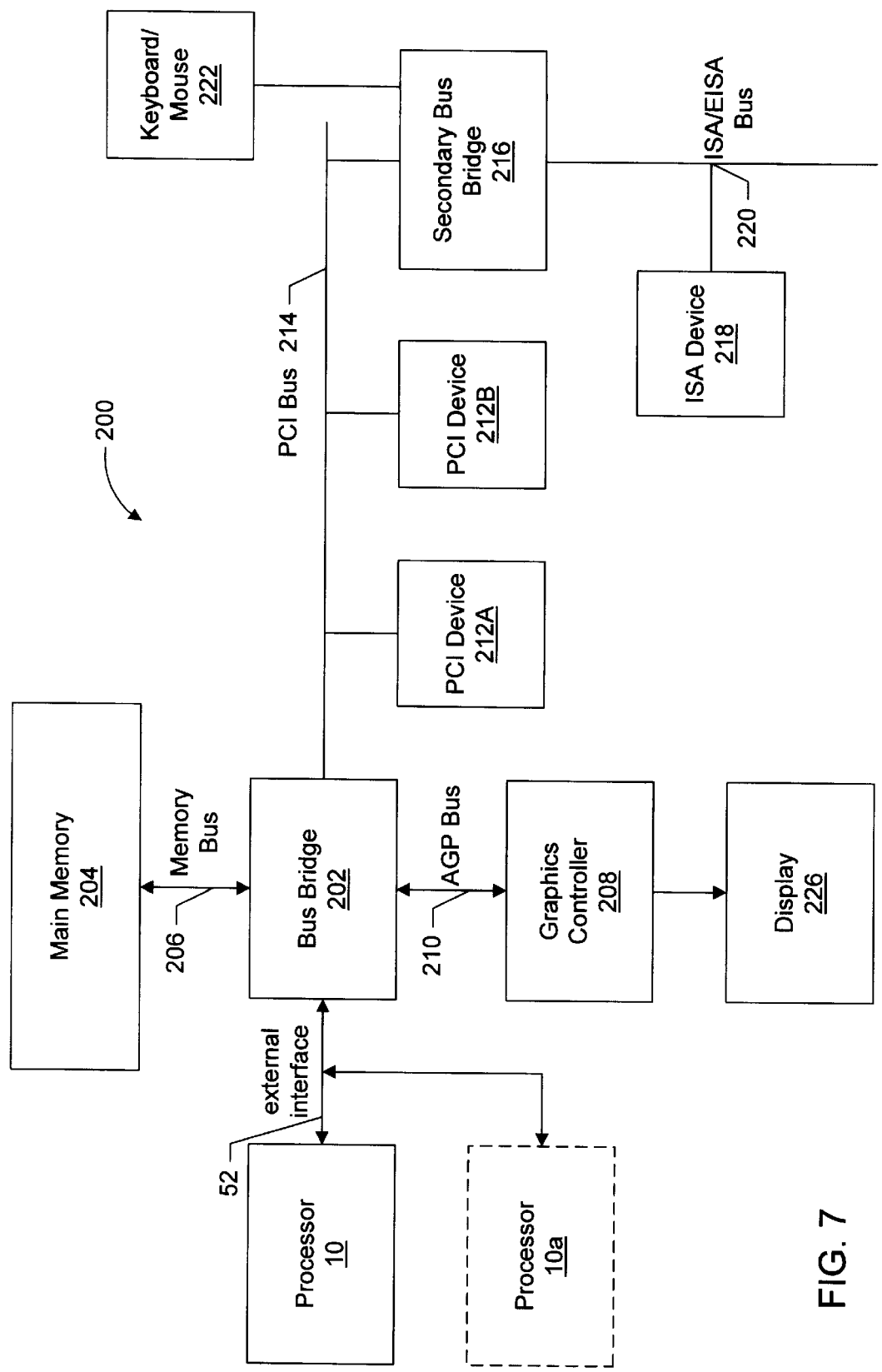
FIG. 7 is a block diagram of a computer system including the processor shown in FIG. 1.

Turning now to FIG. 7, a block diagram of one embodiment of a computer system 200 including processor 10 coupled to a variety of system components through a bus bridge 202 is shown. Other embodiments are possible and contemplated. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Processor 10 is coupled to bus bridge 202 through external interface 52.

Bus bridge 202 provides an interface between processor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to external interface 52 between processor 10 and bus bridge 202 in other embodiments. Alternatively, the external cache may be coupled to bus bridge 202 and cache control logic for the external cache may be integrated into bus bridge 202.

Main memory 204 is a memory in which application programs are stored and from which processor 10 primarily executes. A suitable main memory 204 comprises DRAM (Dynamic Random Access Memory). For example, main memory 204 may comprise a plurality of banks of SDRAM (Synchronous DRAM). Alternatively, main memory 204 may comprise RAMBUS DRAM (RDRAM) or any other suitable DRAM.

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional processors (e.g. processor 10$a$ shown as an optional component of computer system 200). Processor 10$a$ may be similar to processor 10. More particularly, processor 10$a$ may be an identical copy of processor 10. Processor 10$a$ may share external interface 52 with processor 10 (as shown in FIG. 7) or may be connected to bus bridge 202 via an independent bus.

It is noted that various signals are described as being asserted and deasserted herein. A particular signal may be defined to be asserted when carrying a logical one value and deasserted when carrying a logical zero value. Alternatively, a particular signal may be defined to be asserted when carrying a logical zero value and deasserted when carrying a logical one value. It is a matter of design choice which definition is applied to a particular signal.

Numerous variations and modifications will become apparent to those skilled in the art once the above disclosure is fully appreciated. It is intended that the following claims be interpreted to embrace all such variations and modifications.

What is claimed is:

1. A method for forwarding store data accessed by a load from a store queue, the method comprising:

selecting a first byte accessed by said load from a first store queue entry within said store queue, wherein a first store corresponding to said first store queue entry is most recent, in program order, to update said first byte; and selecting a second byte accessed by said load from a second store queue entry within said store queue, wherein said second store queue entry is different than said first store queue entry, and wherein a second store corresponding to said second store queue entry is most recent, in program order, to update said second byte, and wherein said selecting said second byte is independent of said selecting said first byte.

2. The method as recited in claim 1 further comprising:

generating a load bit vector having a bit corresponding to each byte within a predetermined range defined by a predetermined number of least significant bits of a load address corresponding to said load, and wherein said bit is indicative of whether or not a corresponding byte is accessed by said load;

generating a first store bit vector having a bit corresponding to each byte within a predetermined range defined by said predetermined number of least significant bits of a first store address corresponding to said first store, and wherein said bit is indicative of whether or not a corresponding byte is updated by said first store; and generating a second store bit vector having a bit corresponding to each byte within a predetermined range defined by said predetermined number of least significant bits of a second store address corresponding to said second store, and wherein said bit is indicative of whether or not a corresponding byte is updated by said second store.

3. The method as recited in claim 2 wherein said selecting a first byte comprises:

examining a corresponding bit within said load bit vector to determine that said first byte is accessed by said load; and examining a corresponding bit within said first store bit vector to determine that said first store updates said first byte.

4. The method as recited in claim 3 further comprising comparing said load address and said first store address exclusive of said predetermined number of least significant bits, wherein said selecting said first byte is performed responsive to said comparing.

5. The method as recited in claim 4 wherein said selecting a second byte comprises:

examining a corresponding bit within said load bit vector to determine that said second byte is accessed by said load; and examining a corresponding bit within said second store bit vector to determine that said second store updates said second byte.

6. The method as recited in claim 5 further comprising comparing said load address and said second store address exclusive of said predetermined number of least significant bits, wherein said selecting said second byte is performed responsive to said comparing.

7. The method as recited in claim 2 further comprising storing said first store bit vector in said first store queue entry and storing said second store bit vector in said second store queue entry.

8. The method as recited in claim 1 further comprising selecting a third byte accessed by said load from said store queue independent of said selecting a first byte and said selecting a second byte.

9. The method as recited in claim 8 wherein said selecting a third byte comprises selecting said third byte from said first store queue entry responsive to determining that said first store is most recent, in program order, to update said third byte.

10. The method as recited in claim 8 wherein said selecting a third byte comprises selecting said third byte from said second store queue entry responsive to determining that said second store is most recent, in program order, to update said third byte.

11. The method as recited in claim 1 further comprising allocating said first store queue entry upon executing a store address instruction operation.

12. The method as recited in claim 11 further comprising storing data into said first store queue entry upon executing a store data instruction operation.

13. The method as recited in claim 12 further comprising deriving said store address instruction operation and said store data instruction operation from a single instruction.

14. A load/store unit comprising:

a store queue configured to store addresses and data corresponding to stores which are not yet retired to a data cache; and forwarding logic coupled to said store queue and to receive a load address, wherein said forwarding logic is configured to determine, independently for each one of a plurality of bytes accessed by a load corresponding to said load address, which one of said stores stored in said store queue is a most recent update of said one of said plurality of bytes, and wherein said forwarding logic is configured to select at least one of said plurality of bytes from one store within said store queue and at least another one of said plurality of bytes from another store within said store queue.

15. The load/store unit as recited in claim 14 further comprising a first bit vector generator coupled to said store queue and to receive a plurality of least significant bits of each store address, wherein said first bit vector generator is configured to generate a store bit vector corresponding to said each store address, and wherein each bit of said store bit vector corresponds to a byte and is indicative of whether or not that byte is updated by said store, and wherein said load/store unit is configured to store said store bit vector in said store queue.

16. The load/store unit as recited in claim 15 further comprising a second bit vector generator coupled to said forwarding logic and to receive a plurality of least significant bits of said load address, wherein said first bit vector generator is configured to generate a load bit vector corresponding to said load address, and wherein each bit of said load bit vector corresponds to a byte and is indicative of whether or not that byte is accessed by a load corresponding to said load address.

17. The load/store unit as recited in claim 16 wherein said forwarding logic is configured to examine said load bit vector and said store bit vector and a result of comparing said load address (exclusive of said plurality of least significant bits) and said store address (exclusive of said plurality of least significant bits) to determine a most recent update for each byte accessed by said load.

18. A processor comprising:
- at least one execution core including one or more address generation units, wherein said address generation units are configured to generate load addresses corresponding to loads and store addresses corresponding to stores; and
- a load/store unit coupled to said execution core, said load/store unit including a store queue configured to store said store addresses and corresponding store data for stores outstanding within said processor, said load/store unit configured to receive said load addresses and to forward store data corresponding to said loads from said store queue if store data corresponding to said loads is stored therein, wherein said load/store unit is configured to select a particular store within said store queue from which to forward data independently, on a byte by byte basis, for each byte accessed by a particular load.

19. The processor as recited in claim 18 wherein said execution core further comprises a store data unit configured to deliver store data to said load/store unit.

20. The processor as recited in claim 19 wherein said store data unit is configured to deliver store data in response to executing a store data instruction operation.

21. The processor as recited in claim 20 wherein said one or more address generation units comprises a store address generation unit configured to generated said store address in response to a store address instruction operation.

22. The processor as recited in claim 20 wherein said processor is configured to derive said store address instruction operation and said store data instruction operation from a same instruction.

23. The processor as recited in claim 18 further comprising a second execution core coupled to said load/store unit, wherein said second execution core includes one or more address generation units, wherein said address generation units are configured to generate load addresses corresponding to loads and store addresses corresponding to stores.

24. The processor as recited in claim 18 further comprising a data cache coupled to said execution core and said load/store unit, wherein said data cache is configured to provide data accessed by said particular load responsive to a lack of said data in said store queue.

25. The processor as recited in claim 18 wherein said load/store unit is configured to generate a store bit vector corresponding to said particular store, and wherein each bit of said store bit vector corresponds to a byte and is indicative of whether or not that byte is updated by said particular store, and wherein said load/store unit is configured to store said store bit vector in said store queue.

26. The processor as recited in claim 25 wherein said load/store unit is configured to generate a load bit vector corresponding to said particular load, and wherein each bit of said load bit vector corresponds to a byte and is indicative of whether or not that byte is accessed by said particular load.

* * * * *